United States Patent
Schneider et al.

(10) Patent No.: US 7,925,665 B2
(45) Date of Patent: Apr. 12, 2011

(54) USING QUERY PERSISTENCE FOR EFFICIENT SUBQUERY EVALUATION IN FEDERATED DATABASES

(75) Inventors: Donavan A. Schneider, San Francisco, CA (US); Kazi Atif-Uz Zaman, Belmont, CA (US)

(73) Assignee: Siebel Systems, Inc., San Mateo, CA (US)

(*) Notice: Subject to any disclaimer, the term of this patent is extended or adjusted under 35 U.S.C. 154(b) by 258 days.

(21) Appl. No.: 10/877,626

(22) Filed: Jun. 25, 2004

(65) Prior Publication Data
US 2007/0198471 A1 Aug. 23, 2007

Related U.S. Application Data

(60) Provisional application No. 60/551,430, filed on Mar. 8, 2004.

(51) Int. Cl.
*G06F 17/30* (2006.01)

(52) U.S. Cl. .................. 707/774; 707/716; 707/782

(58) Field of Classification Search .............. 707/2, 3, 707/4, 10, 201, 1, 104.1, 202, 204, 205, 609, 707/705, 722, 759, 761, 762, 764, 628–632, 707/716, 769, 774, 782, 999.003, 763; 709/203, 709/217, 239, 246; 711/100, 111, 161, 162
See application file for complete search history.

(56) References Cited

U.S. PATENT DOCUMENTS

| | | | | |
|---|---|---|---|---|
| 5,367,675 A * | 11/1994 | Cheng et al. | ............ | 707/2 |
| 5,590,321 A * | 12/1996 | Lin et al. | ............ | 707/10 |
| 5,600,831 A * | 2/1997 | Levy et al. | ............ | 707/2 |
| 5,668,987 A * | 9/1997 | Schneider | ............ | 707/3 |
| 5,745,746 A * | 4/1998 | Jhingran et al. | ............ | 707/2 |
| 5,761,657 A * | 6/1998 | Hoang | ............ | 707/4 |
| 6,466,933 B1 * | 10/2002 | Huang et al. | ............ | 707/3 |
| 6,477,535 B1 * | 11/2002 | Mirzadeh | ............ | 707/101 |
| 6,684,203 B1 * | 1/2004 | Waddington et al. | ............ | 707/3 |
| 7,174,342 B1 * | 2/2007 | Scheurich et al. | ............ | 707/102 |
| 7,403,986 B1 * | 7/2008 | Li et al. | ............ | 709/223 |
| 2001/0049685 A1 * | 12/2001 | Carey et al. | ............ | 707/103 R |
| 2005/0165751 A1 * | 7/2005 | Bossman et al. | ............ | 707/3 |

OTHER PUBLICATIONS

Pirahesh et al., A Rule Engine for Query Transformation in Starburst and IBM DB2 C/S DBMS, Data Engineering, 1997, Proceedings, 13th International Conference on, Apr. 7-11, 1997, pp. 391-399.*

Akinde et al., Efficient Computation of Subqueries in Complex OLAP, Data Engineering, 2003. Proceedings, 19th International Conference on, Mar. 5-8, 2003, pp. 163-174.*

Chou et al., SQL Query Modification Algorithms, Information Technology, 1990. Next Decade in Information Technology, Proceedings of the 5th Je on (Cat.No. 90TH0326-9), Oct. 22-25, 1990, pp. 551-559.*

* cited by examiner

*Primary Examiner* — Greta L Robinson

(74) *Attorney, Agent, or Firm* — Campbell Stephenson LLP

(57) ABSTRACT

The processing of a query that is submitted to a central controlling server where the central controlling server sources data from one or more backend databases and where such data is referenced by subqueries associated with the query is disclosed.

15 Claims, 3 Drawing Sheets

USING QUERY PERSISTENCE FOR EFFICIENT SUBQUERY EVALUATION IN FEDERATED DATABASES

CROSS REFERENCE TO RELATED APPLICATIONS

This application claims the benefit of U.S. Provisional Patent Application No. 60/551,430 filed Mar. 8, 2004, entitled, "USING QUERY PERSISTENCE FOR EFFICIENT SUBQUERY EVALUATION IN FEDERATED DATABASES", by Donovan A. Schneider and Kazi A. Zaman, and which is hereby incorporated by reference in its entirety.

TECHNICAL FIELD

The present invention is directed to query processing, and more specifically to the processing of a query that is submitted to a central controlling server where the central controlling server sources data from two or more backend databases.

BACKGROUND

A front-end server provides users with access to backend federated data sources (i.e., federated databases). Users can pose complex queries that seek data from such federated data sources. The front-end server is also herein referred to as a central controlling server. The complex queries may contain one or more subqueries.

A subquery is a specialized part of a SQL statement. For example, a subquery is a SELECT query that returns a single value and is nested inside a SELECT, INSERT, UPDATE, or DELETE statement, or inside another subquery. A subquery is also referred to as an inner query, while the statement containing a subquery is also called an outer query.

It is cost prohibitive and inefficient to pull all the data from the associated backend federated databases to the front-end server in order to execute the given query at the front-end server. It is more efficient to send the query to the backend database servers for execution. However, it is often not possible to ship such queries in their entirety to the back-end federated data sources for multiple reasons.

For example,
1. The subqueries in the given query may reference data stored in two or more backend databases controlled by the front-end database server.
2. The subqueries may contain functions that can only be executed at the front-end server.

Consider the following subquery, which belongs to a typical class of queries generated by a front-end application such as a Marketing Automation application.

```
SELECT   Contacts.Name
FROM     MONSTER_FACT
WHERE    Contacts.ROW_ID IN <BASE SEGMENT> AND
         Contacts.ROW_ID IN
             (SELECT Contacts.ROW_ID
              FROM ROLE_F
              WHERE Percentile (rcount (Rank (ROLE_F."# of
              Accounts"))) <
.1
              AND Contacts.ROW_ID IN <BASE SEGMENT>
         ORDER BY Rank (ROLE_F."# of Accounts"))
```

The above query cannot be shipped in its entirety to the associated backend database for execution because the query contains functions supported only at the front-end server. For example, assume that Percentile and Rcount functions are supported only at the front-end server.

If a query cannot be shipped in its entirety to the associated backend database as described above, then according to one approach, such a subquery can be executed at the front-end server by incorporating the literal values from the subquery results into the outer query. Such an approach is also referred to herein as the "expand inlist subquery processing strategy." However, the expand inlist subquery processing strategy may not be feasible if the literal values exceed an allowable limit. For example, assume that the subquery contains more rows than the subquery row limit, which is a parameter that is configurable in the front-end controlling server. In such a case, one will not be able to use the expand inlist subquery processing strategy.

In view of the foregoing, an automated and efficient approach for enabling the front-end server to support subqueries that reference data from two or more associated backend databases, is needed, without adversely affecting the performance of the front-end application queries and without imposing undue maintenance/upgrade costs on existing front-end systems.

DETAILED DESCRIPTION

For purposes of explanation, assume that a front-end server (the controlling server) presents a unified view of a data model to users. The data model sources data from a plurality of backend relational databases. Further assume that the backend relational databases are federated databases. Thus, if the subqueries in a given query references data stored in two or more of the backend federated databases controlled by the front-end database server, then it is not feasible to simply ship the entire query to one of the backend federated databases for execution of the query. Another example that shows it is not feasible ship the entire query to one of the backend federated databases for execution of the query is when the subqueries contain requests that are not supported at the backend database, and/or that the outer query block contains functions that can only be executed at the front-end server.

Figure 1:
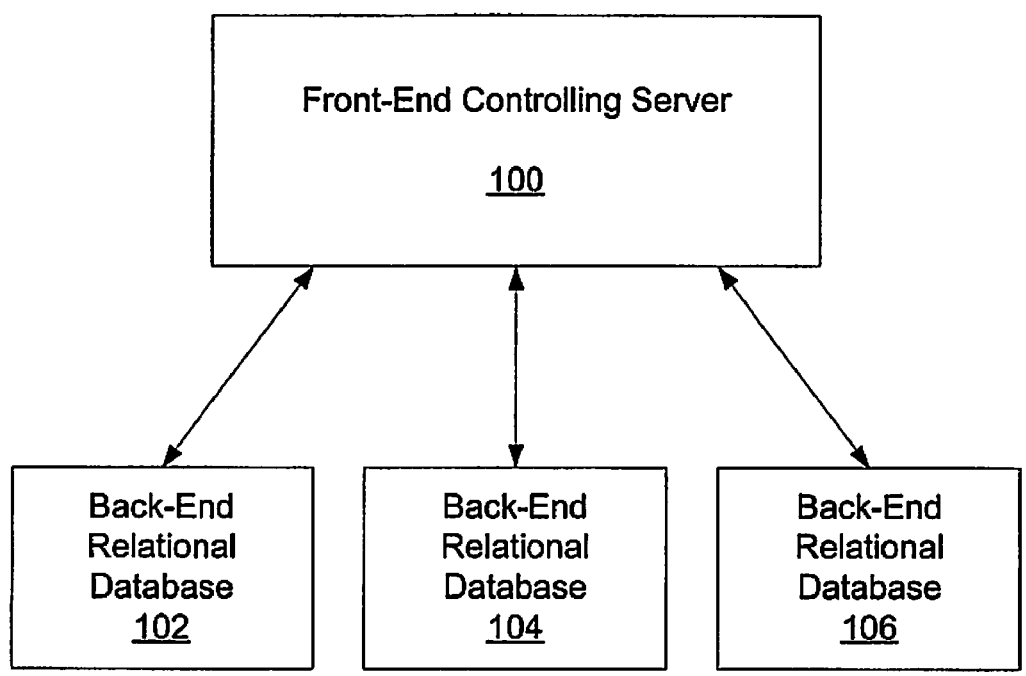
FIG. 1 is a block diagram that shows the logical relationship between a front-end controlling server that sources data from a plurality of backend federated relational databases according to certain embodiments.

FIG. 1 is a block diagram that shows the logical relationship between a front-end controlling server 100 that presents a unified view of a data model, which sources data from a plurality of backend federated relational databases 102, 104 and 106.

According to certain embodiments of the invention, when the front-end server receives a query that cannot be shipped in its entirety to the backend federated databases to be executed because the query includes a subquery that references data from one (database-1) of the backend federated databases, while the rest of the query references data from another (database-2) of the backend federated databases then a facility:

1) causes the subquery to execute on database-1;
2) performs any processing at the front-end server, if needed;
3) persists the subquery results as a table in database-2;
4) rewrites the original query in terms of the newly created persisted table; and
5) executes the rewritten query at database-2 and returns the results to the front-end server.

In some cases, database-1 and database-2 may be the same database as described in examples presented herein. The above method does not apply to correlated subqueries. The facility may either be software, hardware or a combination of software and hardware implemented.

Figure 2:
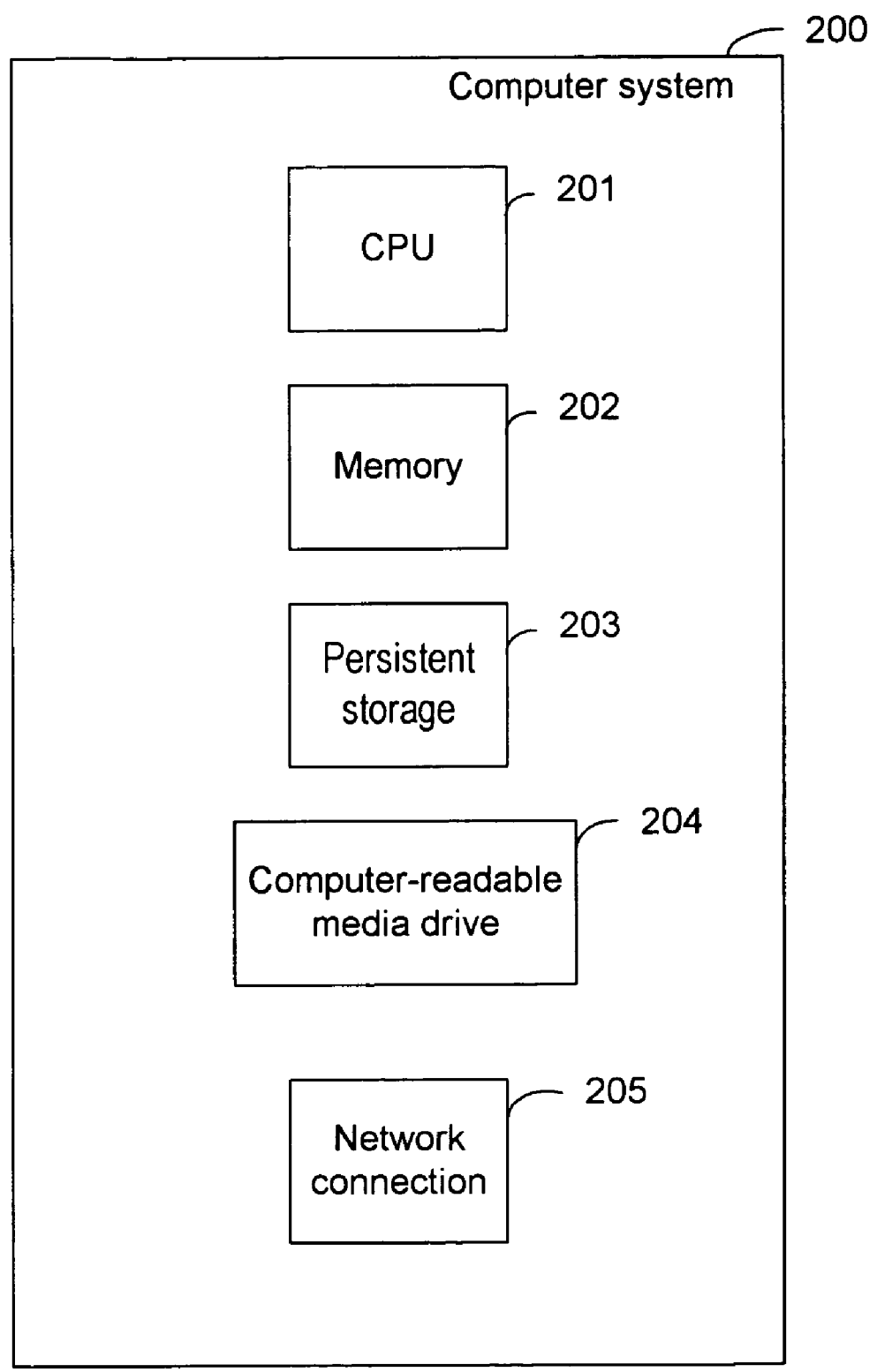
FIG. 2 is a block diagram showing some of the components typically incorporated in at least some of the computer systems and other devices on which the facility executes.

FIG. 2 is a block diagram showing some of the components typically incorporated in at least some of the computer systems and other devices on which the facility executes. These computer systems and devices 200 may include one or more central processing units ("CPUs") 201 for executing computer programs; a computer memory 202 for storing programs and data while they are being used; a persistent storage device 203, such as a hard drive, for persistently storing programs and data; a computer-readable media drive 204, such as a CD-ROM drive, for reading programs and data stored on a computer-readable medium; and a network connection 205 for connecting the computer system to other computer systems, such as via the Internet, to exchange programs and/or data. While computer systems configured as described above are typically used to support the operation of the facility, those skilled in the art will appreciate that the facility may be implemented using devices of various types and configurations, and having various components.

Figure 3:
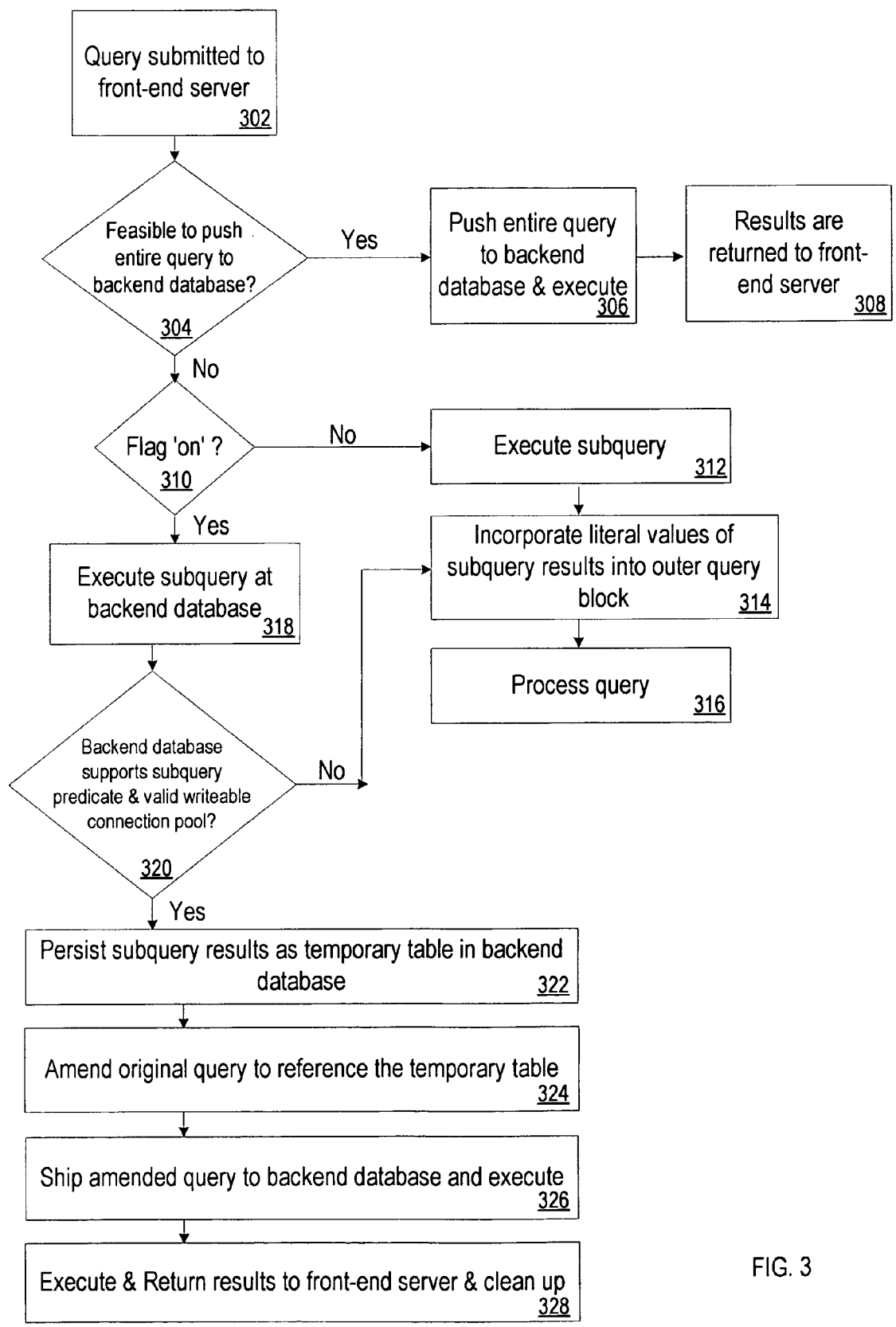
FIG. 3 is a flowchart that illustrates some of the steps for handling a query that references data from several federated databases.

FIG. 3 is a flowchart that illustrates some of the steps for handling a query that references data from several federated databases. Assume that the outer query block references data from one backend database while the subquery references data from another backend database. In FIG. 3 at block 302, a query is submitted at the front-end controlling server. At block 304, it is determined whether it is feasible to push the entire query (subquery and outer block query) to the relevant backend database, i.e., the backend database that contains data referenced by the subquery. If it is feasible to push the entire query to the relevant backend database, then at block 306, the entire query is pushed to the relevant backend database and executed at the relevant backend database. At block 308, the query results are returned to the front-end server.

If at block 304, it is determined that it is not feasible to push the entire query to the backend database, then at block 310, it is determined whether the persist-subquery strategy option is activated (flag is "ON"). If it is determined that the persist-subquery strategy option is not activated (flag is "OFF"), then at block 312, the subquery is executed, either at the backend database, if possible or at the front-end database in the case where the subquery contains a function that is only supported at the front-end database. Next, at block 314, the literal values of the subquery results are incorporated into the outer query block. At block 316, the query is processed at the front-end server. If the number of literal values exceed the maximum limit allowable, then an appropriate error message can be generated.

If at block 310 it is determined that the persist-subquery strategy option is activated, then at block 318 the subquery is executed at the relevant backend database. Next, at block 320, it is determined whether the backend database supports subquery predicates and whether there is a valid connection pool with write-permission to the backend database.

If the backend database does not support subquery predicates and/or there is no valid connection pool with write-permission to the backend database, then control is passed to block 314, and the literal values of the subquery results are incorporated into the outer query block. If, however, it is determined that the backend database supports subquery predicates and that there is a valid connection pool with write-permission to the backend database, then at block 322, the subquery results are persisted, as a temporary table, to the backend database that is referenced by the outer query block. The backend database that contains data referenced by the outer query block may or may not be the same database where the subquery was executed.

At block 324, the originally submitted query is amended to reference the temporary table that is persisted to the relevant backend database. At block 326, the amended query is shipped to the relevant backend database for execution. At block 328, the amended query is executed at the relevant backend database and the results returned to the front-end server, and clean up is performed by deleting the temporary tables.

To further explain, when persistence is required then a check is made to determine if persistence is possible. First, the target physical database, i.e., the backend database that contains data referenced by the outer block query, is determined. The subquery predicate, which may be of the form (expr comparisonOperator list_of_values_from subquery) is examined. The target marker which determines the location of execution for each component of the query plan is called to obtain the target physical database id. If the root of expression tree marks as internal, the persistence strategy is not feasible. Given the target database id, a pointer to a valid connection pool with write permissions for the target database is made. Once a valid connection pool is obtained, steps are taken to persist the results of the subquery to the database. The steps include getting the appropriate table name (fully qualified) for persisting the results of the subquery. The existence of a service providing unique non-reusable table names (and column names) is assumed. Reference to the persisted table should be reflected in the global query plan. This will require specifying the database id, table name and column name for the subquery persisted in the global plan. Tables created during query processing need to be deleted once processing of the overall query is complete. Multiple persisted tables may have been created. Responsibility for deleting the tables is given to the global query which should generate the appropriate "drop table" command for each persisted subquery. The information required for deleting a table includes, the table name, database name and the connection pool information used to create the table. This information is collected for each persisted subquery.

The following are some examples that illustrate the subquery persist-subquery strategy. For the examples below, assume that front-end-server sources data from two backend databases, S_OLAP and S_OLTP.

Simple Query+Subquery, Same Database

Assume that the subquery and the outer query both reference the same backend database, S_OLAP. The outer query and the subquery do not get pushed to the backend for processing because the subquery included SQL (topn) that is not supported (topn) in the backend database. Since the subquery included SQL (topn) that is not supported (topn) in the backend database, the data from the backend database is pulled into the front-end database and the subquery is executed.

select * from S_OLAP.table1 where table1.col1 in (select
       topn(table2.id, 100000) from S_OLAP.table2)

Since the subquery included SQL (topn) that is not supported (topn) in the backend database, the data from the backend database is pulled into the front-end database and the subquery is executed. In the above example, the subquery row limit is reached while executing the subquery. When the subquery row limit is reached, the subquery-persist strategy is adopted. The subquery-persist strategy creates a temporary table in the S_OLAP database, e.g., Temp1, with a single column. The subquery-persist strategy causes the currently evaluated literal values to be inserted into Temp1, and continues to evaluate the subquery but immediately inserts each value back into Temp1.

After Temp1 is populated, the subquery reference in the outer query is replaced with a compiler representation of Temp1. For example, the "new" outer query and subquery can be:

select * from S_OLAP.table1 where table1.col1 in (select temp1.id from S_OLAP.temp1)

The outer query and subquery now target mark for remote execution, i.e., the entire query is shipped to the backend database, S_OLAP, for evaluation. After evaluation is completed the temp table, TEMP1, is dropped.

Simple Subquery, Same Database, Outer Query Cannot Mark

In this example, the outer query block includes SQL (atanh) that cannot be function shipped to the backend database because atanh is not supported by the backend database.

select * from S_OLAP.table1 where table1.col1 in (select topn(table2.id, 100000) from S_OLAP.table2) and atanh(table1.col2)>0.5

In the above query, the subquery is evaluated and then persisted into a temporary table. Next, the outer query is rewritten to reference the temporary table. However, in this case the amended outer query and the subquery do not mark for remote execution due to the function atanh (i.e., the subquery does mark but the outer query does not).

Assume that the limit on subquery values is exceeded. Since the subquery is "too big", the subquery predicate is executed in the front-end server. In other words, the full compiler and code generator are called on the amended outer query. During execution, all the rows from the outer query block (table1) are brought into front-end server. Such rows are then be filtered based on their presence within the subquery (select temp1.id from S_OLAP.temp1).

In this example, the persistence of the subquery is wasted work. Performance is worse than if the subquery-persistence was not adopted. As before, the temporary table needs to be dropped at the end of query processing.

Simple Subquery, Different Databases

In this example, the subquery and the outer query block reference different databases, and thus the entire query does not immediately mark for remote execution.

select * from S_OLAP.table1 where table1.col1 in (select table2.id from S_OLTP.table2)

In the above query, the subquery is executed and the values returned to the front-end server. Assume that the limit on subquery values is exceeded. A temporary table is created in S_OLAP and populated with values from the subquery. The query and query plan are then amended to refer to the temporary table and the outer query and subquery are re-marked. In this example, the entire query marks for remote execution so that the query and subquery are function shipped to the S_OLAP database for execution.

Multiple, Divergent but Simple Subqueries

In this example, the query contains two subqueries, and the subqueries refer to different databases.

select * from S_OLAP.table1 where table1.col1 in (select table2.id from S_OLTP.table2) and table1.col2 in (select table3.id from S_OLAP.table3)

In target marking the above query, the first subquery marks for remote execution in S_OLTP, the second subquery marks for remote execution in S_OLAP, and the outer query marks for internal execution. Assume that the row limit is reached when executing the first subquery. The results of the first subquery should be persisted into the S_OLAP database because that is where table1.col1 exists. Likewise, the second subquery should also be persisted in S_OLAP database. The query (outer query and two subqueries) and query plan are then amended to refer to the temporary tables and the outer query and subqueries are re-marked for execution.

In the foregoing specification, embodiments of the invention have been described with reference to numerous specific details that may vary from implementation to implementation. The specification and drawings are, accordingly, to be regarded in an illustrative rather than a restrictive sense.

We claim:

1. A computer-implemented method comprising:
    receiving a query at a front-end database server, wherein
        said query references data stored in a first backend database and a second backend database, and
        said query comprises a subquery referencing data stored in said first backend database;
    if said query cannot be executed, in its entirety, on said data stored in said first backend database, executing said subquery on said data stored in said first backend database, wherein
        said executing said subquery comprises
            pushing said subquery to said first backend database for execution, if said first backend database supports functions in said subquery and includes data referenced by said subquery, and
            pulling into said front-end database server data referenced by said subquery from said first backend database, if said first backend database does not support said functions in said subquery;
    storing a first set of results from execution of said subquery into a temporary table in said second backend database
        when a persist-subquery option is activated,
        when said second backend database supports a subquery predicate, and
        when there is a valid connection pool with a write permission to said second backend database;
    modifying said query to reference said temporary table, thereby generating a modified query;
    executing said modified query on data stored in said second backend database; and
    displaying results of said executed modified query.

2. The method of claim 1 further comprising:
    performing further processing on said first set of results at said front-end database server if needed before said act of storing.

3. The method of claim 1 further comprising:
    pushing said modified query to said second backend database.

4. The method of claim 1 further comprising:
    executing said modified query at said second backend database to obtain a second set of results.

5. The method of claim 4 further comprising:
    returning said second set of results to said front-end database server.

6. The method of claim 1 further comprising:
    deleting said temporary table when said temporary table is no longer needed.

7. The method of claim 1, further comprising:
    if there are more than one subquery in said query wherein each of said more than one subquery references data in a corresponding one of a plurality of backend databases, then storing a corresponding set of results associated with each of said more than one subquery into corresponding temporary tables in said second backend database.

8. A computer-readable medium storing one or more sequences of instructions, wherein execution of said one or more sequences of instructions by one or more processors causes said one or more processors to perform the acts of:
receiving a query at a front-end database server, wherein
said query references data stored in a first backend database and a second backend database, and
said query comprises a subquery referencing data stored in said first backend database;
if said query cannot be executed, in its entirety, on said data stored in said first backend database, executing said subquery on data stored in said first backend database, wherein
said executing said subquery is performed by
pushing said subquery to said first backend database for execution, if said first backend database supports functions in said subquery and includes data referenced by said subquery, and
pulling into said front-end database server data referenced by said subquery from said first backend database, if said first backend database does not support said functions in said subquery;
storing a first set of results from execution of said subquery into a temporary table in said second backend database
when a persist-subquery option is activated,
when said second backend database supports a subquery predicate, and
when there is a valid connection pool with a write permission to said second backend database;
modifying said query to reference said temporary table, thereby generating a modified query;
executing said modified query on data stored in said second backend database; and
displaying results of said executed modified query.

9. The computer-readable medium of claim 8 further comprising instructions, wherein execution of said instructions by said one or more processors causes said one or more processors to perform the acts of:
performing further processing on said first set of results at said front-end database server if needed before said act of storing.

10. The computer-readable medium of claim 8 further comprising instructions, wherein execution of said instructions by said one or more processors causes said one or more processors to perform the acts of:
pushing said modified query to said second backend database.

11. The computer-readable medium of claim 8 further comprising instructions, wherein execution of said instructions by said one or more processors causes said one or more processors to perform the acts of:
executing said modified query at said second backend database to obtain a second set of results.

12. The computer-readable medium of claim 11 further comprising instructions, wherein execution of said instructions by said one or more processors causes said one or more processors to perform the acts of:
returning said second set of results to said front-end database server.

13. The computer-readable medium of claim 8 further comprising instructions, wherein execution of said instructions by said one or more processors causes said one or more processors to perform the acts of:
performing clean up by deleting said temporary table when said temporary table is no longer needed.

14. The computer-readable medium of claim 8 further comprising instructions, wherein execution of said instructions by said one or more processors causes said one or more processors to perform the acts of:
if there are more than one subquery in said query wherein each of said more than one subquery references data in a corresponding one of a plurality of backend databases, then storing a corresponding set of results associated with each of said more than one subquery into corresponding temporary tables in said second backend database.

15. A system comprising:
a front-end database server, wherein
said front-end database server is configured to receive a database query, wherein
said database query references data stored in a first backend database and a second backend database, and
said database query comprises a subquery referencing data stored in said first backend database,
said front-end database server is further configured to
push said subquery to said first backend database server if said first backend database supports functions in said subquery and includes data referenced by said subquery, and
pull from said first backend database server data referenced by said subquery if said first backend database server does not support functions in said subquery;
a first backend database server configured to access said first backend database and to execute said subquery on data stored in said first backend database, if said query cannot be executed, in its entirety, on said data stored in said first backend database;
a second backend database server configured to
access said second backend database,
store a first set of results from an execution of said subquery into a temporary table in said second backend database when a persist-subquery option is activated,
when said second backend database supports a subquery predicate, and
when there is a valid connection pool with a write permission to said second backend database,
execute a modified query on data stored in said second backend database, wherein said modified query references said temporary table, and
provide results from execution of said modified query to said front-end database server.

* * * * *